United States Patent
Savioz et al.

(10) Patent No.: US 10,945,555 B2
(45) Date of Patent: Mar. 16, 2021

(54) CENTRIFUGAL PUMPING AND FOAMING DEVICE

(71) Applicant: NESTEC S.A., Vevey (CH)

(72) Inventors: Gregory Savioz, Saxonne (CH); Youcef Ait Bouziad, Echandens (CH); Alexa Perrin, Savigny (CH)

(73) Assignee: Societe des Produits Nestle S.A., Vevey (CH)

( * ) Notice: Subject to any disclaimer, the term of this patent is extended or adjusted under 35 U.S.C. 154(b) by 262 days.

(21) Appl. No.: 15/772,288

(22) PCT Filed: Nov. 3, 2016

(86) PCT No.: PCT/EP2016/076602
§ 371 (c)(1),
(2) Date: Apr. 30, 2018

(87) PCT Pub. No.: WO2017/076997
PCT Pub. Date: May 11, 2017

(65) Prior Publication Data
US 2018/0325304 A1 Nov. 15, 2018

(30) Foreign Application Priority Data
Nov. 5, 2015 (EP) ..................................... 15193272

(51) Int. Cl.
*A47J 31/44* (2006.01)
*B01F 3/04* (2006.01)
(Continued)

(52) U.S. Cl.
CPC ......... *A47J 31/4485* (2013.01); *A23C 9/1524* (2013.01); *A23L 2/54* (2013.01);
(Continued)

(58) Field of Classification Search
CPC ............... A23C 9/1524; A23C 2210/30; A47J 31/4485; A47J 31/4496; A47J 43/0711;
(Continued)

(56) References Cited

U.S. PATENT DOCUMENTS

| 4,231,666 A | 11/1980 | Baron |
| 6,095,676 A * | 8/2000 | Kuan ........................ B01F 7/26 |
| | | 366/256 |

(Continued)

FOREIGN PATENT DOCUMENTS

| CN | 100333675 C | 8/2007 |
| CN | 101687592 A | 3/2010 |

(Continued)

OTHER PUBLICATIONS

Chinese Office Action for Appl No. 201680064654.8 dated Nov. 4, 2019.

*Primary Examiner* — Matthew P Travers
(74) *Attorney, Agent, or Firm* — K&L Gates LLP

(57) ABSTRACT

The invention refers to a pumping and foaming device (10) comprising a mixing unit (201) where air and a foamable fluid are conveyed and pre-mixed, and a foaming unit (203) where the mixture of air and fluid is foamed; the device (10) further comprising a processing element (202) rotatable with respect to the foaming unit (203), such that the rotation of the processing element (202) sucks air and fluid by centrifugal forces into the mixing unit (201), where they are conveyed and pre-mixed, that same rotation of the processing element (202) with respect to the foaming unit (203) driving the mixture of air and fluid under a certain level of shear stress which allows the mixture to be foamed. The invention further refers to a pack (100) comprising a device (10) and a fluid container (20), and further to a machine (200) to which such a pack (100) is connectable. The (Continued)

invention also refers to a system (300) comprising a machine (200) and a pack (100).

20 Claims, 4 Drawing Sheets

(51) Int. Cl.
 *A23L 2/54* (2006.01)
 *A23C 9/152* (2006.01)
(52) U.S. Cl.
 CPC ....... *A47J 31/4496* (2013.01); *B01F 3/04453* (2013.01); *A23C 2210/30* (2013.01); *A23V 2002/00* (2013.01)
(58) Field of Classification Search
 CPC .............. A47J 43/0722; B01F 3/04453; B01F 7/00241; B01F 7/0045; B01F 7/00458; B01F 7/00466; A23L 2/54
 See application file for complete search history.

(56) References Cited

U.S. PATENT DOCUMENTS

| | | | |
|---|---|---|---|
| 2004/0009281 A1 | 1/2004 | Green | |
| 2010/0126354 A1* | 5/2010 | Mahlich | A47J 31/4485 99/293 |
| 2013/0101718 A1* | 4/2013 | Kindler | A23C 9/00 426/474 |
| 2016/0367071 A1* | 12/2016 | Dollner | B01F 15/00415 |

FOREIGN PATENT DOCUMENTS

| | | | | |
|---|---|---|---|---|
| CN | 204458346 U | | 7/2015 | |
| CN | 104869876 A | | 8/2015 | |
| DE | 19719784 | | 7/1998 | |
| DE | 102013224786 B3 | * | 3/2015 | ........ B01F 15/00415 |
| JP | 2009034578 A | | 2/2009 | |
| WO | 2013149942 | | 10/2013 | |
| WO | 2014096181 | | 6/2014 | |

\* cited by examiner

CENTRIFUGAL PUMPING AND FOAMING DEVICE

CROSS REFERENCE TO RELATED APPLICATIONS

The present application is a National Stage of International Application No. PCT/EP2016/076602, filed on Nov. 3, 2016, which claims priority to European Patent Application No. 15193272.0, filed on Nov. 5, 2015, the entire contents of which are being incorporated herein by reference.

FIELD OF THE INVENTION

The present invention is directed to a centrifugal device for pumping and foaming a fluid, preferably for producing milk foam, optionally heated. In particular, the invention is directed to a pumping and foaming device producing very high quality fluid foam on demand, having a simple architecture and being easily cleanable.

BACKGROUND OF THE INVENTION

Foams consist of two phases, an aqueous phase and a gaseous (air) phase. A fluid foam is therefore a substance which is formed by trapping many gas bubbles in a fluid structure: producing a fluid foam involves not only the generation of these gas bubbles, but also the packing and the retention of these bubbles into the overall fluid structure in order to provide a stable foam.

It is desirable to produce food foams obtained from food fluid products with the tiny and stable air bubbles to provide a light texture and different mouth feel. In most of the food foams, proteins are the main surface active agents helping in the formation and stabilization of the dispersed gaseous phase, creating protein-stabilized foams. Proteins will always have certain stresses to overcome, such as mechanical and gravitational: the capacity of proteins to stabilize the foaming structure formed against these stresses will determine foam stability, usually expressed as the time required for 50% of the fluid to drain from the foam, i.e., the time required for reaching a 50% reduction in the foam volume.

When foaming a fluid, it would be desirable to produce foam on demand, having a superior quality. Moreover, it would be desirable to provide this prime quality foam as quickly as possible and in a repeatable way, meaning that the foam quality is controlled and can be repeated from one fluid to another.

One of the most commonly used food fluid foams is milk foam. Devices for producing milk foam are well known in the state of the art: typically, these devices comprise a reservoir, into which milk is filled, the reservoir being also provided with a rotating part, typically a whisk arranged in its lower surface, causing the foaming of the milk by agitating the milk which in turn traps air inside the liquid film. The production of milk foam in these known devices requires however time, quite a number of manipulations and also requires cleaning every time foam is produced. Also, in order to regulate the characteristics of the foam obtained, the geometry of the whisk needs to be controlled, something which is hard to understand and control in a precise way, making any repeatability of the process too complex and not achievable.

Document EP 2478804 A1 in the state of the art, for example, discloses a milk reservoir pressurized by gas, the pressurized milk being directed to a mixing area for being further mixed with another gas. Later frothing and reduction of the size of bubbles occurs in a frothing arrangement, comprising typically a static mixer or a rotating whisk. However, the regulation and control of the foaming in such systems is complicated and not precise, also requiring a complex configuration. Moreover, these systems require cleaning after foaming has been produced, which is both cumbersome and time consuming.

Other documents known in the state of the art, such as US 2013/0043274 A1, describe packaging solutions providing storing, dosing and dispensing functions particularly adapted for food fluid products, typically beverages, comprising a container, dosing means and a valve. The dosing means comprise a rotor with at least a truncated part driven in rotation and working as a dosing device, taking liquid from a dosing inlet and driving it to a dosing outlet, such that the liquid from the container is conveyed into a mixing chamber where it is mixed with a diluent: when this diluent is gas ($N_2$ or $CO_2$) a head of foam is provided on the upper layer of the beverage. However, the foaming process in this system is not produced in a controlled and precise way, being very difficult to monitor and to regulate it and, consequently, to obtain repeatable results from one fluid foamed to another.

Accordingly, other solutions have been provided to allow the production of foaming fluids in a controlled and regulated manner. An example is provided in EP 12199185.5 belonging to the same applicant, where a device for producing milk foam is disclosed: high shear stress is applied to a milk-air mixture in the gap between two cylinders rotating with respect to each other, the shear stress leading to an emulsion of the milk and the air, with a later foaming effect once expansion occurs. With this solution, milk foam can be produced in a controlled way. However, the device is relatively complex and requires frequent cleaning after milk foam has been produced, something which is time consuming and not attractive for the user.

There are also well known foaming devices in the state of the art which use steam to foam via a Venturi effect, such as for example the devices shown in EP 2695556 A1 or in EP 2636343 A1. Document EP 2695556 A1 discloses a device for preparing heated milk foam having a suction device comprising a mixing chamber with vapour and milk, such that this mixture is suctioned through utilizing Venturi effect, so that milk foam is provided. Another example is provided in document EP 2636343 A1, where a device for producing heated milk foam is described: this device uses a narrowing nozzle, particularly a Venturi nozzle, for obtaining a suction effect of milk and vapour, in order to produce milk foam. However, these known systems using the Venturi effect are not operated in a clean way, the milk being repeatedly in contact with the device which not only imposes often cleaning but which can also be a source of product contamination. Moreover, these devices only allow the production of hot milk foam: cold milk foam is not an option when using such systems. Apart from this, the quality of the foam obtained by using these systems is not satisfying.

Therefore, there is still a need to provide a simple device which is able to produce high quality foam on demand, in a short time, in a reliable and repeatable way and which can be very easily cleaned. The present invention aims at providing a foaming device which addresses these needs.

SUMMARY OF THE INVENTION

According to a first aspect, the invention relates to a pumping and foaming device comprising a mixing unit where air and a foamable fluid are conveyed and pre-mixed, and a foaming unit where the mixture of air and fluid is foamed: the device further comprises a processing element rotatable with respect to the foaming unit, such that the rotation of the processing element sucks air and fluid by centrifugal forces into the mixing unit, where they are conveyed and pre-mixed, that same rotation of the processing element with respect to the foaming unit driving the mixture of air and fluid under a certain level of shear stress which allows the mixture to be foamed.

Preferably, the processing element is arranged between the mixing unit and the foaming unit, the processing element being rotatable with respect to the mixing unit and the foaming unit, which are static.

The processing element is typically arranged closely to the foaming unit, defining a gap preferably comprised between 0.2 and 0.6 mm, more preferably between 0.3 and 0.5 mm. The foaming unit preferably comprises a disc chamber having a substantially spiral shape for increased pumping performance.

According to the invention, the processing element preferably comprises a patterned surface facing the mixing unit and a substantially flat surface facing the foaming unit. The patterned surface of the processing element is typically configured having a diamond or a propeller shape, the processing element being preferably configured as a disc, or as a cylinder.

Typically, the processing element comprises circulation holes communicating both sides of the processing element.

Further, the device of the invention typically comprises a heating device to allow heating the foam before it is delivered.

The processing element in the pumping and foaming device according to the invention rotates at a speed comprised between 2000 and 10000 rpm, preferably between 4000 and 8000 rpm.

Typically, the mixing unit comprises a path for conveying the fluid configured to have a length such that the fluid content in a container from which the fluid is sucked into the device can be emptied.

The pumping and foaming device of the invention is preferably configured in such a way that the mixing unit, the foaming unit and the processing element can be separated from each other for being cleaned.

According to a second aspect, the invention refers to a pack comprising a pumping and foaming device as the one described and a fluid container for storing the foamable fluid.

Still according to a third aspect, the invention refers to machine to which a pack as the one described is connectable for providing a fluid foam, comprising an air entry and driving means to entrain in rotation the processing element within the pumping and foaming device.

Typically, the machine further comprises a heating source able to heat the foam before being delivered by the pumping and foaming device.

The machine preferably further comprises an air valve adjusting the quantity of air introduced in the mixture of fluid and air in the pumping and foaming device.

According to a fourth aspect, the invention refers to a system for providing a fluid foam on demand comprising a machine and a pack as described previously.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

Figure 1:
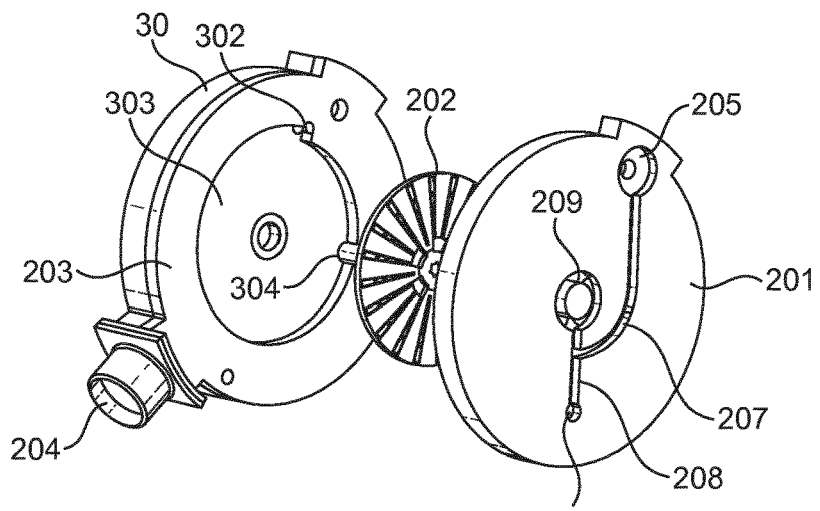
FIG. 1 shows a schematic view of a preferred embodiment of the centrifugal pumping and foaming device of the invention.

The present invention is directed to a centrifugal device 10 for pumping and foaming a fluid, preferably for producing milk foam, which can be optionally heated. In particular, the invention is directed to a pumping and foaming device 10 producing very high quality fluid foam on demand, having a simple architecture and being easily cleanable, as it will be further explained in more detail.

Typically, the fluid processed in the device 10 of the invention is preferably a food or beverage liquid, particularly a foamable liquid such as milk, though any kind of foamable fluid can be used, such as cream, yoghurt, ice-cream liquid mix, non-dairy products or mixes, etc. As shown in the functional view of FIG. 5, the pumping and foaming device 10 is connected to a fluid container 20 from which the fluid enters the device 10 for being foamed. The device 10 typically together with the container 20 and the heating device 30 are integrated into a pack 100 which can be made cleanable or disposable. The pack 100 can be connected to a machine 200 in order to provide the fluid foam.

The pumping and foaming device 10 according to the present invention is represented in FIG. 1: it comprises a mixing unit 201, an inner processing disc 202, a foaming unit 203 and a delivery outlet 204; a heating device 30 can also be part of the device 10, either being arranged at the back of the device 10 (as represented in FIG. 1) or it can also be arranged beside it (not shown). The mixing unit 201 comprises an air inlet 205, where air enters and flows through an air conduit 207. The mixing unit 201 further comprises a fluid inlet 206 communicating with a fluid conduit 208, through which fluid flows and is pre-mixed with the air coming from the air conduit 207. Once both fluid and air have been pre-mixed, they are conveyed through a mixing unit outlet 209 into a foaming unit 203. In the foaming unit 203 the mixture of fluid and air is foamed and then, once foamed, it is conveyed through a chamber outlet 302 and into the heating device 30. The heating device can be activated or not, thus hot or cold fluid foam will be provided through a delivery outlet 204.

We speak about pre-mixing as the fluid is entrained together with air bubbles when brought together by confluence of the air and fluid conduits 207 and 208 in the so called mixing unit 201. However, it is when that pre-mixture is foamed when the air bubbles are made much smaller and a more intimate and complete mixing of the air and the fluid is finally achieved.

Figure 2A:
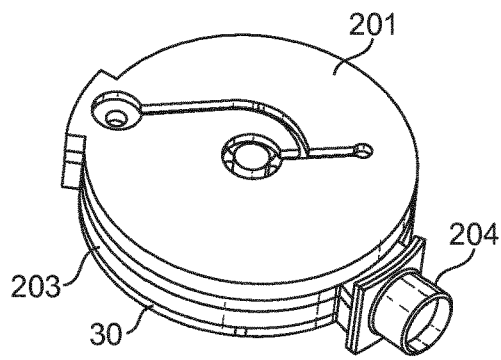
FIGS. 2a-b show the centrifugal pumping and foaming device of the invention as shown in FIG. 1, in a closed and open view, respectively.
Figure 2B:
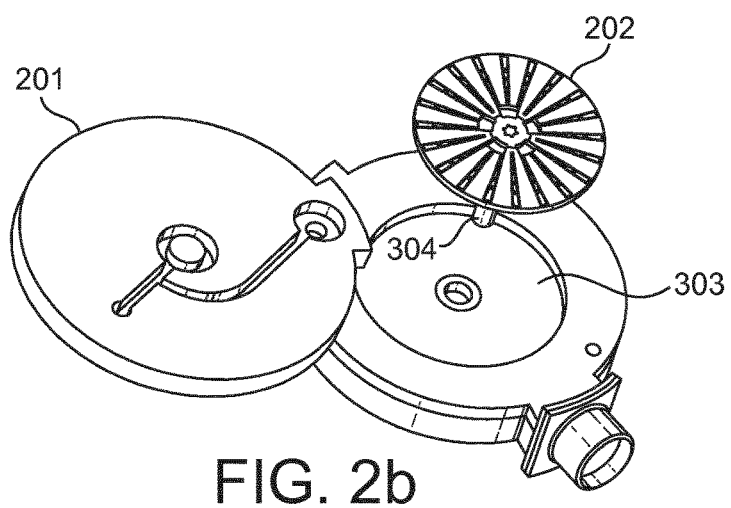

The inner processing disc 202 of the invention is arranged between the mixing unit 201 and the foaming unit 203, as shown in FIG. 1 or in FIG. 2b, for example. The disc 202 rotates by a disc axis 304 connected to a motor connection 305 and entrained in rotation by means of a motor 220. As it can be seen in the Figures attached, particularly in FIGS. 4a-d, the disc 202 comprises one part having a patterned surface and the opposite surface is made substantially flat. The patterned surface helps at pumping/sucking fluid from the container 20 and also air from an air entry 210 into the mixing unit 201 (through the fluid inlet 206 and the air inlet 205, respectively) when the disc rotates. The rotation of the disc 202 is actually what makes it possible to suck the fluid and air thanks to centrifugal forces, and is helped by the patterned surface of it. From the mixing unit outlet 209, the pre-mixture of fluid and air is entrained in centrifugation in the patterned side of the disc 202, diverted towards the external diameter of the disc 202, and then flows into the foaming unit 203: there, the fluid and air mixture is passed by Couette flow: Couette flow refers to a laminar flow of a viscous fluid in the space between two parallel plates, such that one plate is moving relative to the other; the flow is driven by shear force acting on the fluid comprised between the two plates, such that foaming energy is provided through high shear energy to this fluid, which is emulsified. According to the invention, the pre-mixture of fluid and air is driven by shear stress in the gap formed between the substantially flat surface of the disc and the disc chamber 303. The surface part of the disc (flat one) rotates with respect to this disc chamber, which is static. The shear stress provided to the mixture of fluid and air in this gap allows decreasing the size of the air bubbles comprised within the structure of the fluid, so that these bubbles can be more efficiently trapped within the fluid matrix, which highly increases the stability of the foam obtained. Furthermore, the shape of the disc chamber 303 is preferably of the spiral-type, in order to increase pumping performance of the device.

Figure 4A:
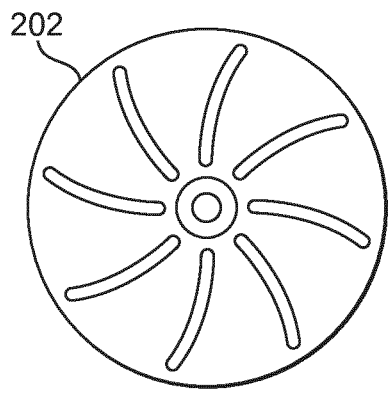
FIGS. 4a-b-c-d show schematic views of different possible embodiments of the inner processing disc in the centrifugal pumping and foaming device of the present invention as shown in FIG. 1.
Figure 4B:
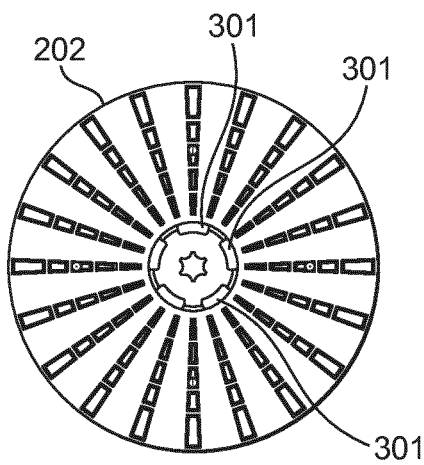
Figure 4C:
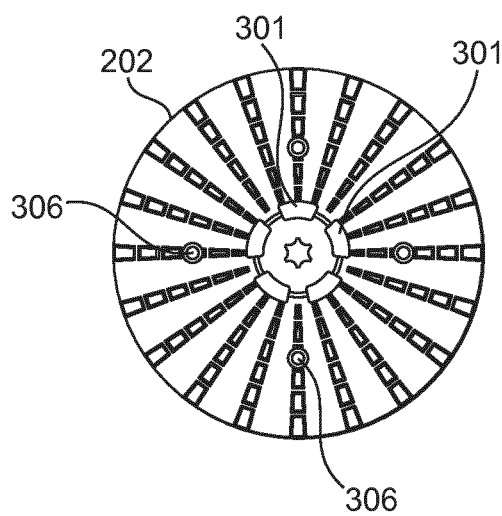
Figure 4D:
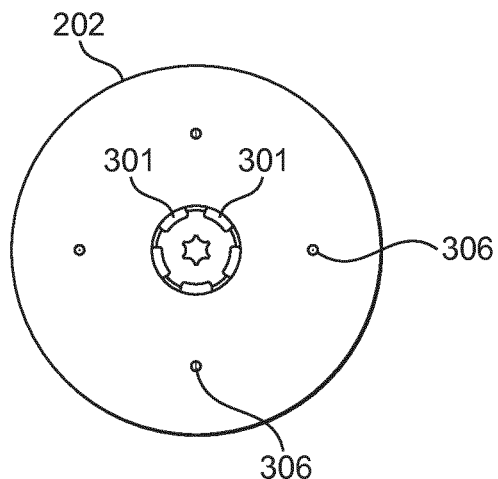

At least one or a plurality of circulation holes 301 are typically arranged cut in the disc 202, as shown in any of FIGS. 4b-c-d in order to improve circulation of the fluid from the patterned side of the disc and into the disc chamber 303, avoiding suction of the disc 202 towards the bottom surface of the disc chamber 303 (that would increase friction resulting in parts wear and foaming of not good quality), improving at the same time pumping performance.

Both sides of the disc 202, the patterned side and the substantially flat one, participate to both pumping and foaming of the pre-mixture of fluid and air. However, it is the patterned side of the disc the one having been specifically designed for pumping, whereas the substantially flat one has been specifically designed for foaming. In fact, when the disc 202 rotates, the patterned side pumps/sucks the pre-mixture of fluid and air by the centrifugal forces created by this rotation: the sucked fluid and air will be sent by centrifugation towards the outer part of the disc 202, creating a pre-foaming and further diverting it between the flat side of the disc and the disc chamber 303 to be finely foamed. Furthermore, the substantially flat surface of the disc, when rotating, also participates to the suction effect of the pre-mixture of air and fluid through the circulation holes 301 and into the disc chamber 303, thus helping also to pumping.

Once the foam has been prepared, it exits the disc chamber 303 through the chamber outlet 302 and goes into the heating device 30, where it can be optionally heated and further delivered through the delivery outlet 204. In fact, foam is produced in cold and can then be later optionally heated when passing through a heating stage in the heating device 30. When the heating device is not actuated, even when the foam circulates through it, it is still delivered cold; however, when activated, the foam circulating will be delivered hot.

The inner processing disc 202 rotates in the device 10 at high speed, in order to be able to both pump/suck foam and air and to foam it. Typical rotational speed values of this disc are comprised between 2000 and 10000 rpm, preferably between 4000 and 8000 rpm.

Even when talking of a disc, the processing rotatable element inside the device 10 of the invention can be made to have the shape of a cylinder in order to provide increased foaming performance. Other shapes are also possible.

Typically, the pumping and foaming device 10 of the invention is made to be either disposable or easily cleanable. Particularly, in this second option, as represented in FIGS. 2a and 2b, the mixing unit 201 and the foaming unit 203 are typically made displaceable with respect to each other so their inner side can be easily accessed and the processing disc 202 can be separated from the rest and be cleaned. The arrangement shown in FIGS. 2a and 2b shows a rotatable axial opening though any other openings, such as using bayonets or hinges are also possible and comprised within the scope of the present invention.

Figure 3A:
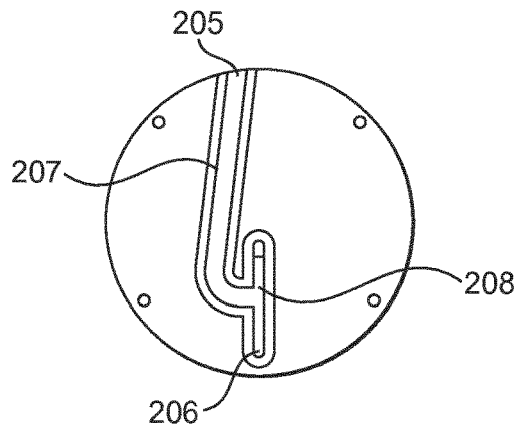
FIGS. 3a-b-c show schematic views of the air and fluid inlets in the centrifugal pumping and foaming device of the present invention as shown in FIG. 1.
Figure 3B:
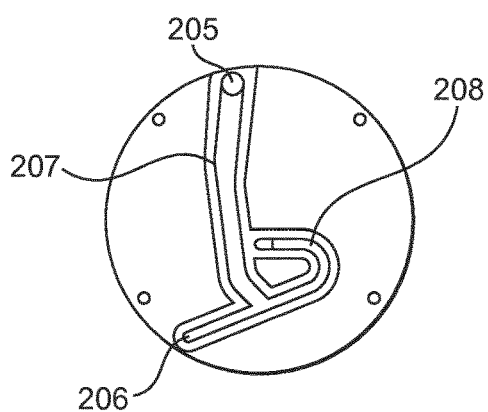
Figure 3C:
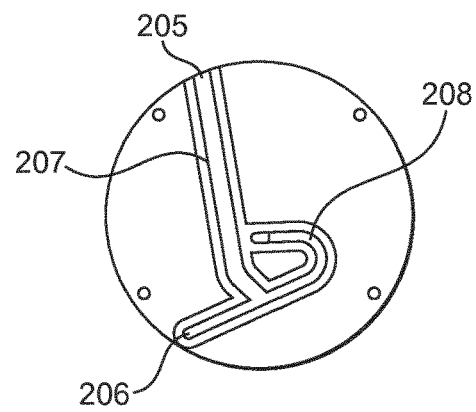

There are different possible configurations for the mixing unit 201 of the present invention, as represented in FIGS. 3a-c: a longer fluid conduit 208 will help emptying the fluid container 20 with a constant flow rate. Preferably, the section of channel configuring the air conduit 207 is comprised between 4 and 12 mm$^2$, approximately. The section of channel for the fluid conduit 208 is comprised between 4 and 8 mm$^2$, approximately.

FIGS. 3a and 3b show embodiments where the air inlet 205 is opened directly towards the outside of the device 10, so no regulation of the air is possible. Another possible (and preferred) embodiment is to have the air inlet 205 connected to the machine 200 (see FIG. 5 and further explanation below) in order to allow control of the air introduced.

As represented in FIGS. 4a-c, different possible arrangements and patterns are possible for the patterned surface of the inner processing disc 202. The one making up a propeller type, as in FIG. 4a, would provide a better pumping but the mixture of fluid and air would be entrained too fast for being able to provide a good foaming of it. The best results for a good pumping and foaming are provided with one of the surfaces having a diamond type shape (as in FIGS. 4b and 4c) and the opposite surface being provided substantially flat (flatness aids for a good foaming). The circulation holes 301 in the patterned surface decrease friction (avoiding the sucking of the disc in the lower surface of the disc chamber 303, as previously explained) and improve circulation of the mixture of fluid and air, improving pumping performance. The flat surface of the disc is further provided with centering pins 306 for correctly placing the disc in the device 10, so as to guarantee a predefined gap on each sides of the disc, i.e. on the disc chamber 303 with respect to the substantially flat surface (this gap is very important for the Couette Flow and for the foaming performance) and on the patterned side of the disc with respect to the lower surface of the mixing unit 201 (this gap being relevant for the pumping/sucking effect needed of air and fluid). Therefore, these centering pins 306 correctly place the disc 202 in height in between the mixing unit 201 and the disc chamber 303.

Typically, the pumping and foaming device 10 allows a plurality of pumping and foaming operations until the container compartment 20 has been emptied of fluid, either if made cleanable or disposable. Between the different foaming applications carried out, the pumping and foaming device 10 and the fluid container 20 are preferably conserved in a proper conservation area, typically in a refrigerator, in order to keep the fluid in a proper hygienic condition.

Figure 5:
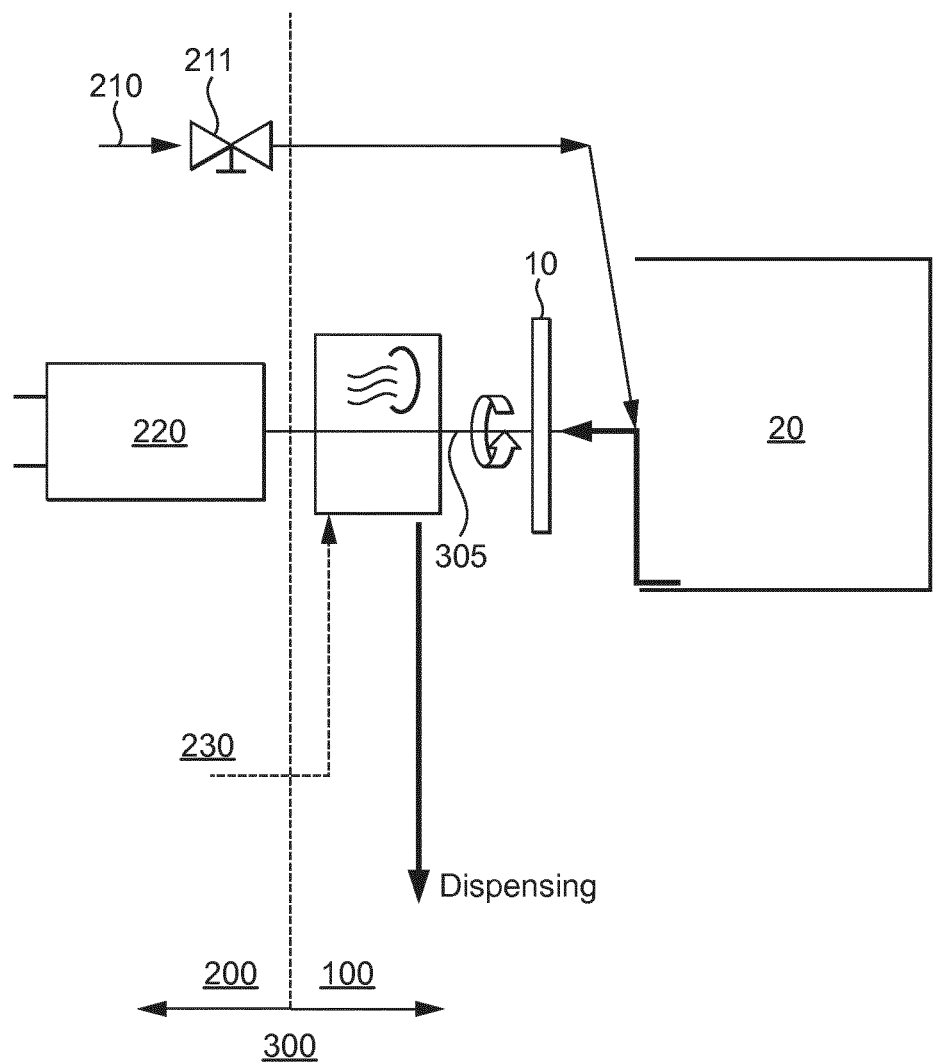
FIG. 5 shows a schematic functional view of a complete system comprising a centrifugal pumping and foaming device according to the present invention.

As represented in FIG. 5, the pumping and foaming device 10 of the invention is typically integrated into a pack 100, which can either be made cleanable or disposable. The pack 100 typically also integrates a fluid container 20. The pack is plugged or connected to a machine 200 which is able to provide the air to the device 10, to entrain in rotation the disc 202 that will pump and foam the mixture of fluid and air and a heating source 230 to provide optional heating to the foam delivered. The machine 200 comprises an air entry 210 which can optionally be linked to an air valve 211 that will adjust the quantity of air integrated in the mixture. The machine 200 further comprises driving means 220, typically a motor, entraining in rotation the inner processing disc 202 inside the device 10, and a heating source 230 able to heat the foam circulating through the heating device 30 in the device 10, when desired. The machine 200 and the pack 100 both configure a system 300 able to provide foam on demand.

Optionally, the machine 200 can also comprise control means (not shown) which will manage and control the foaming process parameters in the pumping and foaming device 10. As an alternative, it is also possible that the machine 200 comprises no control means 36, meaning that the user will then adjust manually part or all of the parameters of the foaming process in the pumping and foaming device 10.

The type of foam obtained from a fluid primary depends on the type of fluid which is foamed. When foaming milk, for example, the type of foam obtained varies depending on the type of milk used, such as raw whole milk, pasteurized homogenized full-cream milk, pasteurized skim milk, UHT homogenized full-cream milk, UHT skim milk, etc. For a given type of milk, leaving apart the processing conditions used during its manufacture, foaming properties are largely determined by the temperature at which milk is foamed and by its fat and protein content.

On the other hand, the quality of fluid foam is determined by foam properties, such as: quantity and size of the air bubbles formed in the fluid structure once foamed; foam stability, defined as the amount of foam which is stable, i.e., which substantially keeps its volume, usually expressed as the time required for 50% of the fluid to drain from the foam (the time required for reaching a 50% reduction in the foam volume), and foaming level defined as the ratio of the volume of fluid entering the device 10 with respect to the volume of foam provided by the delivery outlet 204 (also known as foam overrun, which is defined as the increase in volume in a certain initial volume of fluid by the effect of foaming).

Therefore, for a given type of fluid (i.e., the fat and protein content and the processing conditions during the fluid manufacture are fixed values), the properties of the foam obtained (quantity/size of bubbles, stability and overrun) for this fluid will be determined by the foaming process carried out in the pumping and foaming device 10 of the invention, specifically by the process parameters detailed as follows:

Fluid flow rate passing from the container compartment 20 into the device 10 which depends on the rotational speed of the disc 202 and its pattern, on the diameter of the fluid conduit 208 providing fluid from the container compartment 20.

Amount of air coming from the air inlet 205, depending on the rotational speed of the disc 202 and on the size of the air conduit 207.

In the Couette flow effect carried out in the pumping and foaming device 10 of the invention, the shear stress experienced by the mixture of fluid and air in the foaming unit 203 depends largely on the width of the gap formed between the flat surface of the disc 202 and the inner surface of the disc chamber 303: this width is chosen depending on the type of fluid in the container compartment 20 which is to be foamed, chosen in such a way that optimal foaming effect by shear (Couette flow) is obtained. Typically, the width of the gap is larger as more viscous the fluid to be foamed is: for example, milk would require a much smaller gap than liquid yogurt. Typically, the width of the gap for milk is around 0.3 mm and 0.5 mm and the width for liquid yogurt is higher.

The pumping and foaming device 10 can also comprise a code, typically a bar code, comprising the information of process parameters, which is provided to the control means in the machine 200 to carry out the foaming process in an optimal way.

The device of the invention is able to provide superior quality foam on demand: micro foam will be delivered, with a higher quality to the foam currently on the market, with adjustable foam texture and thickness, such that the foam delivery will have quick and stable foam settling. Furthermore, the device of the invention is compact, needing very limited equipment on the machine side, easy to use on the part of the user and clean, as no fluid comes in contact with the machine. Also, the foam provided by the device can be either hot or cold, and will have very high stability. Even more, the device provides repeatability of the foam obtained, such that the same foam can be essentially obtained from one beverage to the other, thanks to the fact that the process carried out in the device is controlled by acting on limited and stable parameters, thus providing high reliability of results.

In summary, some of the main advantages of the device of the invention are:
Superior micro foam being delivered
Adjustable foam density, by acting on the air entry and optionally on the adjustable air valve
Simple architecture (only one part is rotation, which is the inner processing disc)
In-line system, direct to cup
Possibility of having embodiments either very easily cleanable or disposable Although the present invention has been described with reference to preferred embodiments thereof, many modifications and alterations may be made by a person having ordinary skill in the art without departing from the scope of this invention which is defined by the appended claims.

The invention claimed is:
1. A pumping and foaming device comprising:
a mixing unit where air and a foamable fluid are conveyed and pre-mixed into a mixture of the air and the foamable fluid, wherein the mixing unit comprises an outlet leading into a disc chamber in which a processing element is positioned, the mixing unit further comprises an air inlet and a fluid inlet each at different radial positions in the mixing unit relative to the outlet of the mixing unit, the air inlet configured for the air to enter the mixing unit through the air inlet and flow through an air conduit in the mixing unit, the fluid inlet configured for the foamable fluid to enter the mixing unit through the fluid inlet and flow through a fluid conduit in the mixing unit, the air and fluid conduits are perpendicular to an axis of rotation of the processing element and merge with each other prior to the mixing unit outlet;

a foaming unit where the mixture of the air and the foamable fluid is foamed into a foam; and the processing element comprising circulation holes communicating a first side of the processing element with a second side of the processing element opposite the first side, the processing element rotatable with respect to the foaming unit, such that the rotation of the processing element sucks the air and the foamable fluid by centrifugal forces into the mixing unit, wherein the same rotation of the processing element with respect to the foaming unit drives the mixture of air and fluid under a shear stress effective for the mixture to be foamed.

2. The pumping and foaming device according to claim 1 wherein the processing element is arranged between the mixing unit and the foaming unit, the processing element being rotatable with respect to the mixing unit and the foaming unit, which are static.

3. The pumping and foaming device according to claim 1, wherein the processing element is arranged closely to the foaming unit, defining a gap of between 0.2 mm and 0.6 mm.

4. The pumping and foaming device according to claim 1, wherein the foaming unit comprises the disc chamber having a substantially spiral shape.

5. The pumping and foaming device according to claim 4, wherein the mixture of the air and the flowable fluid is driven by the shear stress into a gap between the disc chamber and a surface of the processing element.

6. The pumping and foaming device according to claim 5, wherein the surface of the processing element, with which the disc chamber forms the gap, is substantially flat and faces the foaming unit.

7. The pumping and foaming device according to claim 6, wherein the surface of the processing element that is substantially flat and faces the foaming unit is on the first side of the processing element, and the second side of the processing element comprises a patterned surface.

8. The pumping and foaming device according to claim 7, wherein the circulation holes are configured to circulate the foamable fluid from the patterned surface into the disc chamber.

9. The pumping and foaming device according to claim 1, wherein the processing element comprises a patterned surface facing the mixing unit and a flat surface facing the foaming unit.

10. The pumping and foaming device according to claim 9 wherein the patterned surface of the processing element has a geometric pattern originating from the center of the processing element and radiating outward towards the perimeter of the processing element.

11. The pumping and foaming device according to claim 1 wherein the processing element is a disc.

12. The pumping and foaming device according to claim 1 wherein the processing element is a cylinder.

13. The pumping and foaming device according to claim 1 comprising a heater configured for heating the foam before the foam is delivered.

14. The pumping and foaming device according to claim 1 wherein the processing element rotates at a speed of between 2000 rpm and 10000 rpm.

15. The pumping and foaming device according to claim 1 wherein the mixing unit comprises a path for conveying the foamable fluid, the path configured such that a container from which the foamable fluid is sucked into the foaming and pumping device can be emptied.

16. The pumping and foaming device according to claim 1 configured such that the mixing unit, the foaming unit and the processing element can be separated from each other for being cleaned.

17. A pack comprising:

a pumping and foaming device comprising (i) a mixing unit where air and a foamable fluid are conveyed and pre-mixed into a mixture of the air and the foamable fluid, wherein the mixing unit comprises an outlet leading into a disc chamber in which a processing element is positioned, the mixing unit further comprises an air inlet and a fluid inlet each at different radial positions in the mixing unit relative to the outlet of the mixing unit, the air inlet configured for the air to enter the mixing unit through the air inlet and flow through an air conduit in the mixing unit, the fluid inlet configured for the foamable fluid to enter the mixing unit through the fluid inlet and flow through a fluid conduit in the mixing unit, the air and fluid conduits are perpendicular to an axis of rotation of the processing element and merge with each other prior to the mixing unit outlet;

(ii) a foaming unit where the mixture of the air and the foamable fluid is foamed into a foam; and (iii) the processing element comprising circulation holes communicating a first side of the processing element with a second side of the processing element opposite the first side, the processing element rotatable with respect to the foaming unit, such that the rotation of the processing element sucks the air and the foamable fluid by centrifugal forces into the mixing unit, wherein the same rotation of the processing element with respect to the foaming unit drives the mixture of air and fluid under a shear stress effective for the mixture to be foamed; and a fluid container for storing the foamable fluid.

18. A system comprising a pack and a machine to which the pack is connectable for providing a fluid foam, the pack comprising:

a pumping and foaming device comprising (i) a mixing unit where air and a foamable fluid are conveyed and pre-mixed into a mixture of the air and the foamable fluid, wherein the mixing unit comprises an outlet leading into a disc chamber in which a processing element is positioned, the mixing unit further comprises an air inlet and a fluid inlet each at different radial positions in the mixing unit relative to the outlet of the mixing unit, the air inlet configured for the air to enter the mixing unit through the air inlet and flow through an air conduit in the mixing unit, the fluid inlet configured for the foamable fluid to enter the mixing unit through the fluid inlet and flow through a fluid conduit in the mixing unit, the air and fluid conduits are perpendicular to an axis of rotation of the processing element and merge with each other prior to the mixing unit outlet;

(ii) a foaming unit where the mixture of the air and the foamable fluid is foamed into a foam; and (iii) the processing element comprising circulation holes communicating a first side of the processing element with a second side of the processing element opposite the first side, the processing element rotatable with respect to the foaming unit, such that the rotation of the processing element sucks the air and the foamable fluid by centrifugal forces into the mixing unit, wherein the same rotation of the processing element with respect to the foaming unit drives the mixture of air and fluid under a shear stress effective for the mixture to be foamed;

the pack further comprising a fluid container for storing the foamable fluid; the machine comprising an air entry and a driver to entrain in rotation the processing element within the pumping and foaming device.

19. The system according to claim 18 comprising a heater configured to heat the foam before being delivered by the pumping and foaming device.

20. The system according to claim 18 comprising an air valve configured for adjusting the quantity of air introduced in the mixture of fluid and air in the pumping and foaming device.

\* \* \* \* \*